United States Patent
Balasubramanian et al.

(10) Patent No.: US 9,003,012 B2
(45) Date of Patent: Apr. 7, 2015

(54) SYSTEM AND METHOD FOR TRACKING USER IDENTITY AND/OR ACTIVITY ACROSS MULTIPLE WEBSITES

(75) Inventors: Chandra Balasubramanian, Cleveland, OH (US); Scott Rauhe, Lakewood, OH (US); Matthew Yucha, Mentor, OH (US)

(73) Assignee: Cardinalcommerce Corporation, Mentor, OH (US)

( * ) Notice: Subject to any disclaimer, the term of this patent is extended or adjusted under 35 U.S.C. 154(b) by 0 days.

(21) Appl. No.: 12/404,722

(22) Filed: Mar. 16, 2009

(65) Prior Publication Data

US 2009/0265460 A1    Oct. 22, 2009

Related U.S. Application Data

(60) Provisional application No. 61/036,823, filed on Mar. 14, 2008.

(51) Int. Cl.
  *G06F 15/16* (2006.01)
  *G06F 15/173* (2006.01)
  *H04L 12/26* (2006.01)
  *H04L 29/08* (2006.01)
  *G06Q 10/08* (2012.01)

(52) U.S. Cl.
  CPC ............ *H04L 12/2602* (2013.01); *H04L 43/00* (2013.01); *H04L 67/22* (2013.01); *H04L 67/02* (2013.01); *H04L 67/142* (2013.01); *G06Q 10/0833* (2013.01)

(58) Field of Classification Search
  CPC .......................... H04L 29/08675; H04L 67/22
  USPC ................. 709/224, 245; 705/26, 27
  See application file for complete search history.

(56) References Cited

U.S. PATENT DOCUMENTS

| | | | |
|---|---|---|---|
| 6,223,215 | B1 | 4/2001 | Hunt et al. |
| 7,062,475 | B1 | 6/2006 | Szabo et al. |
| 2002/0004733 | A1* | 1/2002 | Addante ........................... 705/7 |
| 2002/0029290 | A1 | 3/2002 | Burema et al. |
| 2002/0052806 | A1 | 5/2002 | Hodson et al. |
| 2006/0271669 | A1* | 11/2006 | Bouguenon et al. .......... 709/224 |
| 2007/0156890 | A1 | 7/2007 | Promny |
| 2008/0040143 | A1* | 2/2008 | Freeman et al. .................. 705/1 |
| 2008/0052392 | A1* | 2/2008 | Webster et al. ............... 709/224 |
| 2008/0077561 | A1* | 3/2008 | Yomtobian ....................... 707/3 |
| 2008/0082568 | A1* | 4/2008 | Miller et al. ................ 707/102 |
| 2009/0138448 | A1* | 5/2009 | Barsness et al. .................. 707/3 |
| 2009/0182643 | A1* | 7/2009 | Holstein et al. ................. 705/26 |

OTHER PUBLICATIONS

International Search Report (Oct. 28, 2009).

(Continued)

* cited by examiner

*Primary Examiner* — Peter Shaw
(74) *Attorney, Agent, or Firm* — Fay Sharpe LLP

(57) ABSTRACT

A method of tracking a user and the user's activities on a telecommunications network. The method includes receiving a notification from a first web server that the user has accessed a first webpage on a first website, wherein the notification is received via a user tracking server operated by a tracking coordinator, setting a session cookie including a user tracking ID on the user's computer and/or web browser to track the user's activities on the network and storing tracking data for the user in a database associated with the user tracking server, receiving an indication from a second web server that the user has accessed a second webpage on a second website, wherein the second webpage comprises a confirmation webpage that includes transaction data for the user, retrieving the user tracking ID from the session cookie and associating the user tracking ID retrieved from the cookie with the transaction data obtained from the second webpage, and reporting the user tracking data to the first web server.

16 Claims, 3 Drawing Sheets

SYSTEM AND METHOD FOR TRACKING USER IDENTITY AND/OR ACTIVITY ACROSS MULTIPLE WEBSITES

This application claims priority from U.S. Provisional Application Ser. No. 61/036,823 filed on Mar. 14, 2008.

BACKGROUND

The present inventive subject matter relates to the art of tracking a user on a telecommunications network. It finds particular application in conjunction with tracking the identity and/or activity of a particular user across multiple websites on a public data network such as the Internet, and it will be described with particular reference thereto. However, one of ordinary skill in the art will appreciate that it is also amenable to other like applications.

By way of background, Internet commerce, or e-commerce as it is otherwise known, relates to the buying and selling of products and services by buyers and sellers over the Internet or the transactional exchange of information. The convenience of shopping over the Internet has sparked considerable interest in e-commerce on behalf of both buyers and sellers.

In many instances, an Internet website owner or operator or other like provider may desire to track the identity and/or activity of a user visiting their website. For example, a provider of a first website (i.e., a parent or referring or source website) may have a commercial agreement with a provider of a second website (i.e., a child or referred or destination website). According to the terms of the agreement, the parent website provider may be entitled to compensation from the child website provider when a user visiting the parent website is referred, directed or otherwise forwarded therefrom to the child website and the user makes a purchase from or completes some other designated activity on the child website.

As can be appreciated, to fulfill the obligations of the parties, it is desirable to track the identity and/or activity of the user from one website to the next. Traditionally, user tracking across websites has been accomplished by embedding a suitable user or tracking ID in a character string appended to the URL (Uniform Resource Locator) address employed when forwarding the user from the referring website to the destination website.

For example, assume a user employs a suitable web browser operating on their computer to visit a parent website on the Internet (e.g., at URL www.parentwebsite.com). When the user selects a link on the parent website which directs them to a child website (e.g., at URL www.childwebsite.com). an address line on the user's web browser may be loaded with the following data:

http://www.childwebsite.com/homepage.html/601-1838785-5442513?&AFID=Performics_Incentive%20Networks&LNM=Target %20Br and %20Banner %2088×31 &ref=tgt_adv_xasd0971

Accordingly, the user's browser is redirected to child website at URL www.childwebsite.com. and the child website suitably tracks the user via the user tracking ID, in this case, "–1838785-5442513?&AFID=Performics_Incentive %20Networks" obtained from the URL address string. While visiting the child website, if the user referred thereto from the parent website completes a designated activity (e.g., makes a purchase), then the completed action is associated with the corresponding user tracking ID and reported back to the provider of the parent website that referred to the user to the child website. Generally, this reporting is conducted off-line.

Of course, the above example is rather simplified. In practice, a parent website may refer multiple visitors or users to any number of different child websites. Accordingly, tracking multiple users being referred to multiple child websites becomes relatively more complex. In any event, as persons of ordinary skill in the art will appreciate, both the parent website and the child website have to be specifically equipped and/or otherwise provisioned to conduct the aforementioned tracking. That is to say, the parent website has to be provisioned to embed the user tracking ID in the URL address string and has to further maintain appropriate records of which user tracking IDs were provided to which users in order to reconcile reporting data received from child website providers. Additionally, child websites also have to be provisioned to recognize and read the user tracking ID data embedded in the URL address strings, and the child websites have to be provisioned to carry and/or otherwise manage each user's tracking ID as they navigate between various pages on the child website so that designated completion actions carried out by various users can be properly associated with their corresponding user tracking IDs for reporting back to the appropriate referring website provider. Accordingly, as can be appreciated, tracking a user's identity and/or activities across multiple websites in the aforementioned traditional manner imposes significant burdens on both the parent website and child website providers.

Therefore, a new and improved system and method for tracking a user's identity and/or activity from one website to another that overcomes the above-referenced problems and others is needed.

BRIEF DESCRIPTION

In accordance with an aspect of the present invention, a method of tracking a user and the user's activities on a telecommunications network is provided. The method comprises receiving a notification from a first web server that the user has accessed a first webpage on a first website, wherein the notification is received via a user tracking server operated by a tracking coordinator, setting a session cookie including a user tracking ID on the user's computer and/or web browser to track the user's activities on the network and storing tracking data for the user in a database associated with the user tracking server, receiving an indication from a second web server that the user has accessed a second webpage on a second website, wherein the second webpage comprises a confirmation webpage that includes transaction data for the user, retrieving the user tracking ID from the session cookie and associating the user tracking ID retrieved from the cookie with the transaction data obtained from the second webpage, and reporting the user tracking data to the first web server.

Optionally, the first webpage may include a first invisible tracking image or tracking script that is served to the user's computer or web browser along with the first webpage and references the user tracking server of the tracking coordinator and/or the second webpage may include a second invisible tracking image or tracking script that is served to the user's computer or web browser along with the second webpage and references the user tracking server of the tracking coordinator. Further, the tracking coordinator may report the tracking data back to the first web server in real-time or in batches.

In accordance with another aspect of the present invention, a system for tracking a user and the user's activities on a telecommunications network is provided. The system comprises means for receiving a notification from a first web server that the user has accessed a first webpage on a first website, means for setting a session cookie including a user tracking ID on the user's computer and/or web browser to track the user's activities on the network and means for storing tracking data for the user in a database, means for receiving an indication from a second web server that the user has accessed a second webpage on a second website, wherein the second webpage comprises a confirmation webpage that includes transaction data for the user, means for retrieving the user tracking ID from the session cookie and associating the user tracking ID retrieved from the cookie with the transaction data obtained from the second webpage, and means for reporting the user tracking data to the first web server.

In accordance with another aspect of the present invention, an apparatus for tracking a user and the user's activities on a telecommunications network is provided. The apparatus comprises a user tracking server that is operated by a tracking coordinator. In particular, the user tracking server is operative to perform the following functions: receive a notification from a first web server that the user has accessed a first webpage on a first website, set a session cookie including a user tracking ID on the user's computer and/or web browser to track the user's activities on the network and storing tracking data for the user in a database associated with the user tracking server, receive an indication from a second web server that the user has accessed a second webpage on a second website, wherein the second webpage comprises a confirmation webpage that includes transaction data for the user, retrieve the user tracking ID from the session cookie and associate the user tracking ID retrieved from the cookie with the transaction data obtained from the second webpage, and report the user tracking data to the first web server.

In accordance with yet another aspect of the present invention, a computer program product is provided. The computer program product comprises a computer-usable data carrier storing instructions that, when executed by a computing device, cause the computing device to perform a method. The method includes receiving a notification from a first web server that the user has accessed a first webpage on a first website, setting a session cookie including a user tracking ID on the user's computer and/or web browser to track the user's activities on the network and storing tracking data for the user in a database, receiving an indication from a second web server that the user has accessed a second webpage on a second website, wherein the second webpage comprises a confirmation webpage that includes transaction data for the user, retrieving the user tracking ID from the session cookie and associating the user tracking ID retrieved from the cookie with the transaction data obtained from the second webpage, and reporting the user tracking data to the first web server.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

Figure 1:
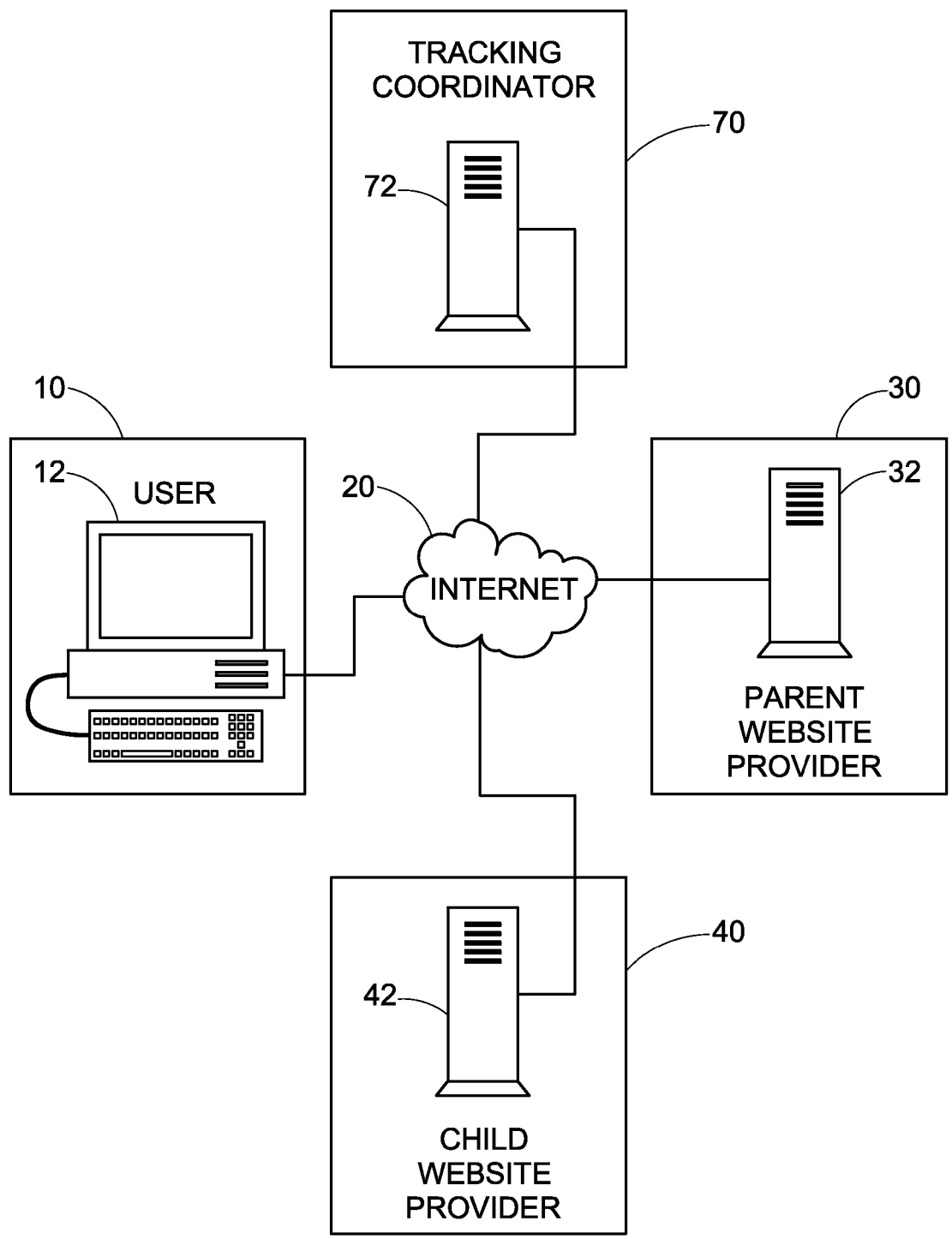
FIG. 1 is a diagrammatic illustration showing an exemplary service architecture for tracking a user's identity and/or activity across multiple websites which embodies aspects of the present inventive subject matter.
Figure 4:
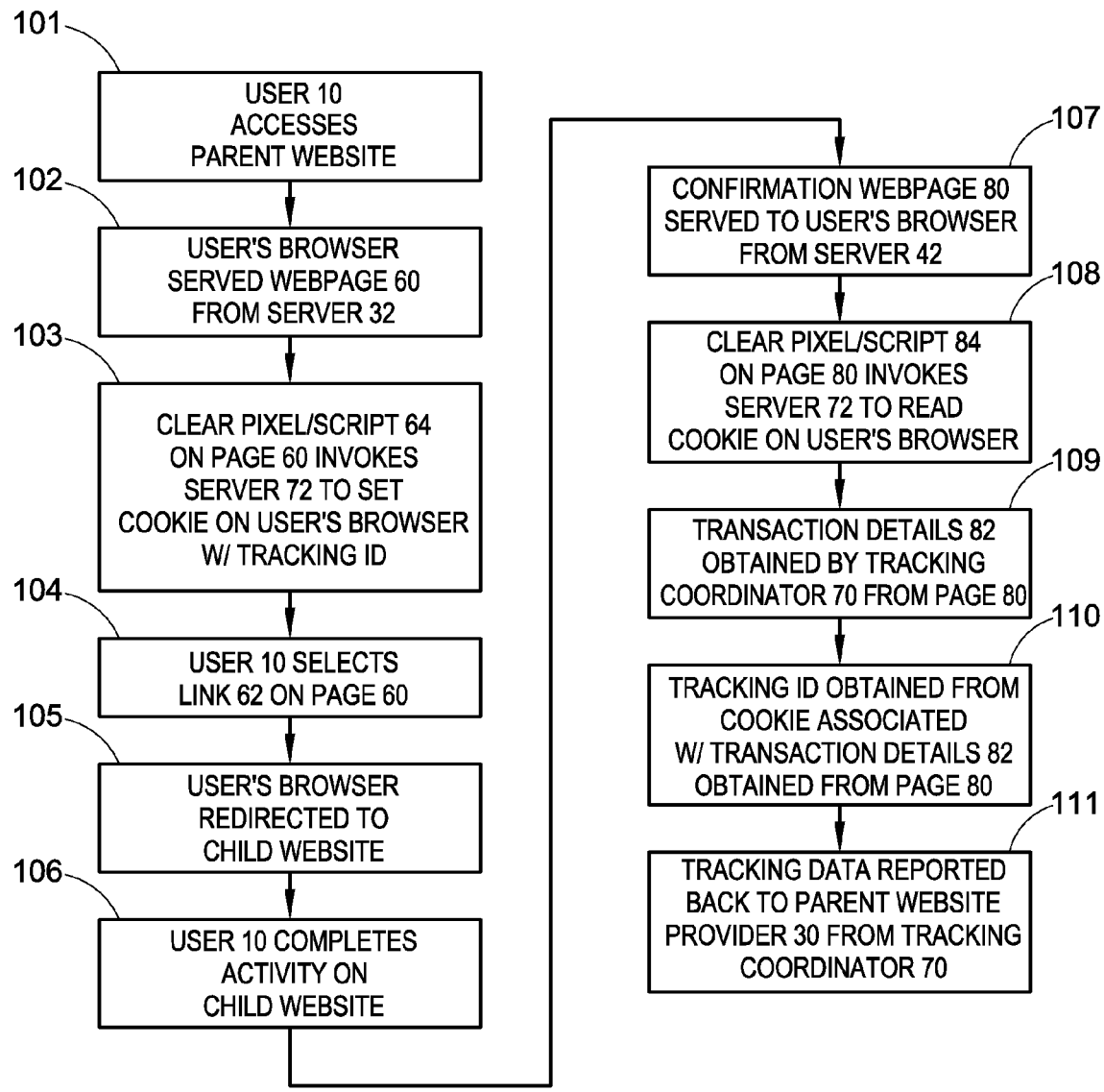
FIG. 4 is a flow chart showing an exemplary process for tracking the identity and/or activity of a user across multiple websites in accordance with aspects of the present inventive subject matter.

Referring now to the drawings wherein the showings are for purposes of illustrating the exemplary embodiments only and not for purposes of limiting the claimed subject matter, as illustrated in FIG. 1, a user 10 may visit a first (or parent) website (step 101—see FIG. 4). Of course, the user tracking system described herein is preferably applied to multiple similarly situated users. However, in the interest of simplicity herein, only one user 10 is shown in FIG. 1.

The user 10 typically employs a computer 12 or other suitable end user device on which a web browser or the like is running to access the first website over a telecommunications network 20. A web browser is a software application that enables a user to display and interact with text, images, videos, music, games and other information typically located on a webpage at a website. Text and images on a webpage can contain hyperlinks to other webpages at the same or different website. Web browsers allow a user to quickly and easily access information provided on many webpages at many websites by traversing these links.

It is to be understood that the computer 12 may be a personal computer, a laptop, a personal digital assistant, a mobile phone, or other communication device for accessing the Internet. By way of example, the network 20 is optionally a public data network such as the Internet or another suitable data network on which the first website is provided by a first website provider 30, such as a website owner, operator or the like. Suitably, the computer 12 or end user device employed by the user 10 is operatively connected to the network 20 in the usual manner. Additionally, the first website is suitably provided via a first web server 32 or other like server that is also operatively connected to the network 20 in the usual manner. A website (or Web site) is a collection of related webpages (or Web pages), images, videos or other digital assets that are hosted on one web server, usually accessible via the Internet.

Figure 2:
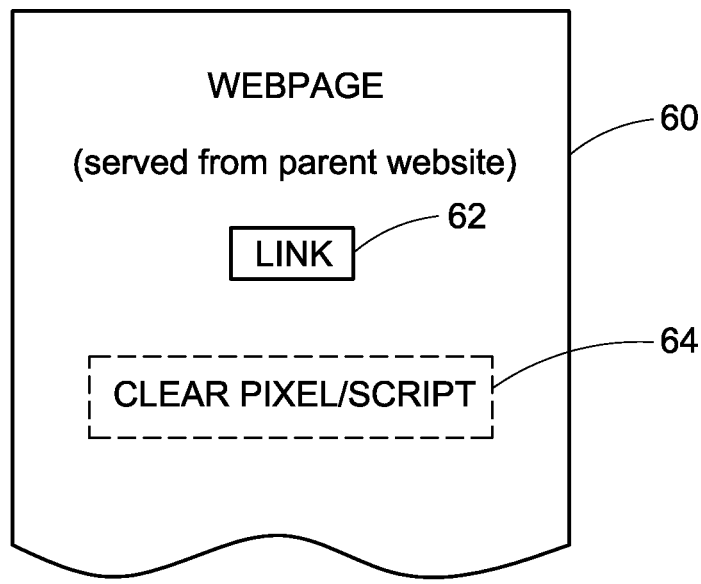
FIG. 2 is a diagrammatic illustration showing an exemplary webpage of a parent website with a link to a child website, the webpage including aspects of the present inventive subject matter.

The user's web browser is thus served a first webpage 60 via the first web server 32 (step 102). A webpage is a document, typically written in HTML, that is almost always accessible via HTTP, a protocol that transfers information from the web server to display in the user's web browser. An example of the first webpage 60 is illustrated in FIG. 2. Suitably, the location of the webpage 60 is identified by a uniform resource locator (URL), Internet address or other like location identifier, and it is optionally formatted in HTML, XML, SGML or another suitable format.

As shown in FIG. 2, a link 62 (e.g., a hyperlink or the like) is generally provided on the webpage 60 of the first website. The link 62 references, for example, a second (or child) website. The second website is provided by another website provider 40, for example, a website owner, operator or the like, and the second website is provided via a second web server 42 or other like server that is also operatively connected to the network 20 in the usual manner. For simplicity, only two website providers are shown in FIG. 1 and discussed herein. However, it is to be understood that multiple websites and/or website providers may be visited and tracked in accordance with aspects of the present invention.

In one embodiment, the webpage 60 containing the link 62 has embedded therein or is otherwise provisioned with a clear pixel 64 or other invisible tracking image or tracking script that is served to the user's computer 12 or web browser along with the webpage 60. This clear pixel 64 or tracking image or script suitably references a user tracking server 72 of a tracking coordinator 70. Accordingly, when the user 10 accesses the webpage 60 containing the clear pixel 64 or tracking image or script (for example, in order to select the link 62 to the second website), the user tracking server 72 of the tracking coordinator 70 is invoked or notified to set a session cookie on the user's computer 12 and/or web browser with a corresponding user tracking ID (step 103). As used herein, a session cookie refers to parcels of text sent by a server to a web client (usually a browser) and then sent back unchanged by the client each time it accesses that server. Session cookies are generally used for authenticating, session tracking (state maintenance), and maintaining specific information about users, such as site preferences or the contents of their electronic shopping carts.

Additionally, a record of the user tracking ID assigned to the user 12 is optionally maintained by the tracking coordinator 70. In that case, the record is stored in a database associated with the user tracking server 72.

Accordingly, when the user 10 selects the link 62 on the webpage 60 of the first website (step 104), their computer 12 and/or web browser will be redirected to the second website (step 105). In this manner, the user 10 visiting the first website will be forwarded thereby to the second website via the first web server 32. Suitably, the location of the second webpage may also be identified by a uniform resource locator (URL), Internet address or other like location identifier, and it is optionally formatted in HTML, XML, SGML or another suitable format. Additionally, when the user 10 selects the link 62 on the webpage 60 of the first website, a session cookie or the like is set on the user's computer 12 or web browser with a user tracking ID or other like value particular to that user 12. In this case, the cookie is set by the tracking coordinator 70 employing a user tracking server 72, which is operatively connected to the network 20 in the usual manner.

Suitably, the user 10 is now free to navigate about the second website (step 106). Upon completion of a designated activity by the user 10, for example, the purchase of a product or service from the second website, the second website provides the user 10 with a confirmation page or the like, which confirms completion of the designated activity (step 107). More specifically, the second web server 42 provides a confirmation webpage 80 to the computer 12 and/or web browser of the user 10.

Figure 3:
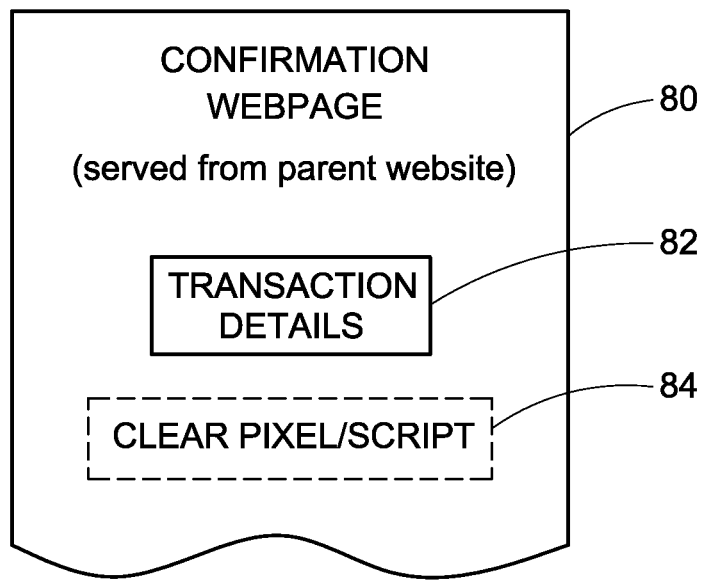
FIG. 3 is a diagrammatic illustration showing an exemplary confirmation webpage of a child website provided in response to completion of a designated activity by a user, the confirmation webpage including aspects of the present inventive subject matter.

As shown in FIG. 3, the confirmation webpage 80 optionally includes transaction details 82 regarding the completed activity, such as a transaction amount or purchase price, along with other pertinent information. Additionally, the confirmation webpage 80 also has embedded therein or is otherwise provisioned with another clear pixel 84 or other invisible tracking image or tracking script that again references the user tracking server 72 of the tracking coordinator 70. In this case, the clear pixel 84 or other tracking image or script invokes or notifies the user tracking server 72 to read or otherwise access the cookie set on the user's computer 12 and/or web browser (step 108). Provided the cookie is found and is valid, the tracking coordinator 70 retrieves or otherwise obtains the value thereof (step 109). That is, the user tracking server 72 retrieves the user tracking ID and associates the user tracking ID retrieved from the cookie with the transaction details 82 obtained from the confirmation webpage 80 (step 110).

Based upon the notification method desired by the first website provider 30, the tracking coordinator 70 optionally reports the tracking data (i.e., the user tracking ID obtained from the cookie along with associated transaction details 82 obtained from the confirmation webpage 80) back to the first website provider 30 (a) in real-time or (b) in batches (step 111). In this manner, the user's identity and/or activities are tracked across multiple websites with minimal burden placed upon the website providers 30 and 40.

The detailed description above is represented, at least in part, in terms of processes and symbolic representations of operations performed by computer components, including a central processing unit (CPU), memory storage devices for the CPU, and connected display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, methods, etc. described herein are not limited to any particular computer or apparatus. Rather, various types of general purpose machines may be used with programs constructed, in accordance with the teachings described herein. Similarly, it may prove advantageous to construct specialized apparatus to perform the method steps described herein by way of dedicated computer systems with hard-wired logic or programs stored in nonvolatile memory, such as read only memory. A suitable computer program product incorporating aspects of the exemplary embodiments may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of tracking a user and the user's activities on a telecommunications network, the method comprising:
receiving a notification with a user tracking server connected to the network that a computer and/or web browser of the user has accessed a first webpage on a first website, and the first webpage includes a linked invisible tracking image or tracking script that invokes upon loading the tracking server to set a session cookie including a user tracking identifier (ID) on the user's computer and/or web browser;
storing the user tracking data in a database associated with the user tracking server, and the user tracking data includes a tracking ID and the accessing of the first webpage;
receiving a second indication with the tracking server that the computer and/or web browser has accessed a second webpage on a second website, and the second webpage comprises a confirmation webpage that includes a linked second invisible tracking image or tracking script that invokes upon loading the tracking server to retrieve the user tracking ID from the session cookie and associate the user tracking ID retrieved from the cookie with transaction data obtained from the second webpage; and
reporting the user tracking data which includes the user tracking ID, accessing of the first web page and accessing the second web page to a server of the first website.

2. The method of claim 1, wherein the second invisible tracking image or script invokes the tracking server to retrieve the user tracking ID further includes transaction data retrieved from the second webpage; and
wherein reporting the accessing of the second web page further includes reporting of the transaction data retrieved from the second webpage.

3. The method according to claim 2, wherein the transaction data includes a transaction amount.

4. The method of claim 1, further including:
receiving a third indication with the tracking server that the computer and/or web browser has accessed a third webpage from a third website, and the third webpage include a linked third invisible tracking image or script that references the user tracking server and the third invisible tracking image or script invokes the tracking server to retrieve the user tracking ID; and
wherein reporting further includes reporting the accessing of the third web page to the server of the first website.

5. The method of claim 4, wherein the reporting includes reporting the tracking data to the server of the first website in real-time, and the tracking data includes the accessed webpages of each linked site.

6. The method according to claim 1, wherein the second indication is one of a plurality of received indications with the tracking server that the computer and/or web browser has accessed webpages, each webpage on a different website and each webpage configured for serving of an invisible tracking image or script that invokes the tracking server to read the tracking ID and transaction data from the accessed webpage;
wherein storing includes storing the transaction data from each of the accessed webpages with the tracking ID; and
wherein reporting further includes reporting the transaction data stored from each of the accessed webpages based on the tracking ID.

7. An apparatus for tracking a user and the user's activities on a telecommunications network, the apparatus comprising:
a user tracking server operative to:
in response to the user accessing a first webpage from a first website on a server different from the user tracking server, and the first webpage includes a plurality of links, each link directed to a webpage of a different website, and a further link to a first invisible tracking image or tracking script that invokes the user tracking server to set a session cookie which includes a user tracking identifier (ID) on the user's computer and/or web browser;
store tracking data for the user including the user tracking ID in a database associated with the user tracking server;
in response to the user accessing a second webpage on a second website of one of the different websites and the second webpage includes transaction data for the user, and a second further link to a second invisible tracking image and/or tracking script that invokes the tracking server to retrieve the user tracking ID from the session cookie and associate the user tracking ID with transaction data obtained from the second webpage; and
report the user tracking data including the user tracking ID, accessing of the first webpage, accessing of the second webpage, and the transaction data from the second website to a server of the first website.

8. The apparatus of claim 7, wherein the linked second invisible tracking image includes a linked a clear pixel image.

9. The apparatus of claim 7, wherein the user tracking server is operative to:
in response to the user accessing a plurality of webpages, each webpage from one of the different websites, and each webpage includes transaction data for the user and a link to an invisible tracking image and/or tracking script that invokes the tracking server to retrieve the user tracking ID from the session cookie and associate the user tracking ID with transaction data obtained from each of the plurality of webpages; and
report the transaction data obtained from each of the plurality of webpages to the server of the first web server.

10. The apparatus of claim 7, wherein the tracking data, which includes the accessing of the first webpage and the accessing of the second webpage and the transaction data of the second webpage, is reported back to the server of the first website in real-time or in batches.

11. The apparatus according to claim 7, wherein the user accesses the second webpage by entry of a universal resource locator (URL) of the second webpage in the browser.

12. A computer program product comprising:
a non-transitory computer readable medium storing instructions that, when executed by a computing device, cause the computing device to perform a method comprising:
in response to a user accessing a first web page with a web browser and the first webpage from a first website different from the computing device and the first webpage includes a link to an invisible tracking image or tracking script that references the computing device, setting a session cookie on a user's computer and/or the web browser with loading of the link, and the session cookie includes a user tracking identifier (ID);

storing the user tracking ID and tracking data for the user in a database;

in response to the user accessing a second webpage from a second website in the web browser, and the second webpage comprises a confirmation webpage that includes transaction data for the user and a second link to a second invisible tracking image or tracking script that references the computing device, obtaining the transaction data from the second webpage, retrieving the user tracking ID from the session cookie, associating the user tracking ID retrieved from the cookie with the transaction data obtained from the second webpage, and reporting the user tracking data to a server of the first website in real-time; and wherein the computing device, the first website and the second website are maintained by different parties.

13. The computer program product of claim 12, wherein the user accesses the second webpage by entry of a universal resource locator (URL) in the browser.

14. The computer program product of claim 12, wherein the first webpage includes a plurality of links each to a different website to be tracked with the liked invisible tracking image or tracking script.

15. The computer program product of claim 12, wherein the tracking coordinator reports the tracking data back to the first web server in real-time or in batches.

16. A system for tracking a user and the user's activities on a telecommunications network, the system comprising:

one or more tracking servers configured to:
set a session cookie including a user tracking identifier (ID) on an end user device in response to the end user device accessing a webpage of a first web server, the webpage including a first clear pixel tracking image or tracking script which references the one or more tracking servers;

store a record of the user tracking ID in a database;

retrieve the user tracking ID from the session cookie in response to the end user device accessing a confirmation webpage of a second web server, the confirmation webpage confirming the completion of a designated activity and including:
a second clear pixel tracking image or tracking script which references the one or more tracking servers; and transaction details which include a transaction amount, wherein the confirmation webpage displays the transaction amount; and report the transaction details and the user tracking ID to the first web server in real-time;

wherein the webpage of the first web server includes a plurality of links, each link to a different web server, and each different web server includes at least one web page with the second invisible tracking image or tracking script.

* * * * *